United States Patent [19]
Ojima

[11] Patent Number: 4,724,583
[45] Date of Patent: Feb. 16, 1988

[54] HOSE BAND
[75] Inventor: Juji Ojima, Ebina, Japan
[73] Assignee: NHK Spring Co., Ltd., Yokohama, Japan
[21] Appl. No.: 863,700
[22] Filed: May 15, 1986
[30] Foreign Application Priority Data
 May 23, 1985 [JP] Japan .................................. 60-110916
 Nov. 18, 1985 [JP] Japan .............................. 60-176953[U]
[51] Int. Cl.⁴ .............................................. B65D 63/00
[52] U.S. Cl. .................................. 24/20 R; 24/20 CW
[58] Field of Search ............... 24/16 R, 16 PB, 20 R, 24/20 CW, 20 EE, 21, 20 TT, 22, 23 R, 23 W, 23 EE, 30 SW, 20 W

[56] References Cited
U.S. PATENT DOCUMENTS

| 1,980,154 | 11/1934 | Coe | 24/20 EE X |
|---|---|---|---|
| 2,805,673 | 9/1957 | Solomon | 24/16 PB |
| 3,106,757 | 10/1963 | Thurston et al. | 24/20 CW |
| 3,210,815 | 10/1965 | Breuning | 24/20 EE |
| 4,222,155 | 9/1980 | Oetiker | 24/20 CW X |
| 4,226,007 | 10/1980 | Duenser | 24/20 EE |
| 4,299,012 | 11/1981 | Oetiker | |
| 4,442,154 | 4/1984 | Fortsch et al. | 24/20 EE X |
| 4,517,708 | 5/1985 | Calmettes et al. | 24/20 CW |

FOREIGN PATENT DOCUMENTS

| 2606736 | 9/1977 | Fed. Rep. of Germany | 24/22 |
|---|---|---|---|
| 976687 | 3/1951 | France | 24/20 EE |

Primary Examiner—Kenneth J. Dorner
Assistant Examiner—James R. Brittain
Attorney, Agent, or Firm—Frishauf, Holtz, Goodman & Woodward

[57] ABSTRACT

A hose band according to the present invention comprises an elongated metallic band body which, when in use, is wound around a hose so that both end portions thereof are joined to each other. The band body has spaced apart retaining holes formed in an outer lap portion and hooks formed on an inner lap portion and adapted to engage the holes. The hooks each have a slanting surface which protrudes obliquely toward the end side of the outer lap portion. The bulge outward so that their cross section is outwardly convex.

20 Claims, 29 Drawing Figures

F I G. 18
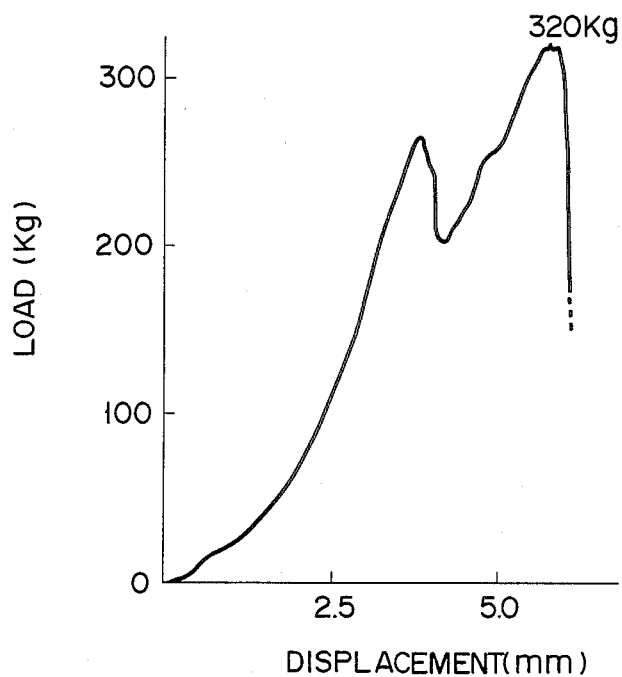
F I G. 19
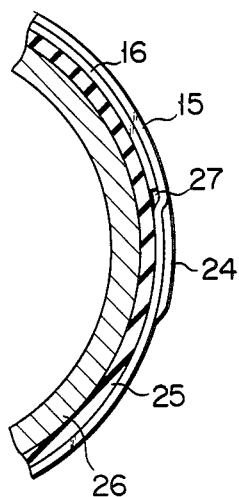

F I G. 20
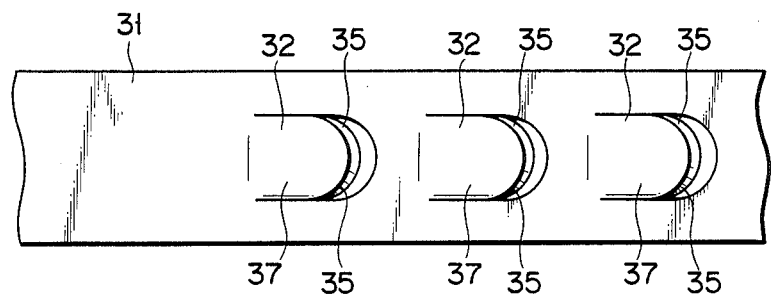
F I G. 21
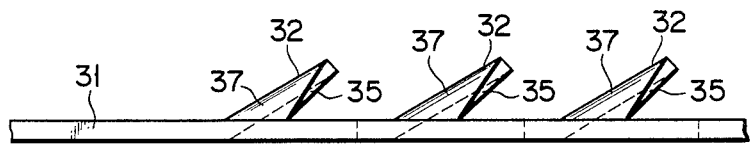

HOSE BAND

BACKGROUND OF THE INVENTION

The present invention relates to a hose band for fixing a hose to a pipe.

In a conventional hose band, as shown in FIG. 1, an elongated metallic band body 1 is coiled into a ring and wound around a hose (not shown) such that both end portions thereof are jointed and hook 2 is fitted in retaining hole 3. Then, clamp lug 4, which is formed at the middle portion of body 1, is crushed from both right and left sides (FIG. 1). As a result, the ring-shaped band body has a diameter small enough to fix the hose to a pipe (not shown). Hook 2 is formed by cutting, and outwardly obliquely raising, a part of band body 1.

If the clamping force of the conventional hose band is increased for improved sealing capability, hook 2 cannot be strong enough and will be deformed to be disengaged from retaining hole 3, as indicated by the two-dot chain line in FIG. 2.

To cope with this, there has been developed a hose bank (U.S. Pat. No. 4,299,012) in which elongated metallic band body 5 is provided with projections 6 and 7 of two different forms, as shown in FIGS. 3 and 4. In this band, first projection 6 is slanted and adapted to be fitted in one of retaining holes 8 so that two overlapping end portions of band body 5 contact. Thus, projections 6 and 7 can be prevented from slipping out of holes 8. Second projections 7 are strong enough to withstand a great tensile force produced by clamping action.

Of projections 6 and 7 of the two different forms, only projection 7 can maintain the strength of the band. For improved strength, therefore, the band of this type is not very efficient. Moreover, the formation of the projections of different types requires a complicated processing work, thus increasing manufacturing cost.

SUMMARY OF THE INVENTION

The object of the present invention is to provide a hose band capable of resisting great clamping force by using a hook or hooks of only one form, and of preventing the hook(s) from being unexpectedly disengaged from a retaining hole or holes.

According to one aspect of the present invention, there is provided a hose band which comprises an elongated metallic band body adapted to be wound around a hose, the band body having inner and outer lap portions overlapping each other at both end portions, individually, a retaining hole formed in the outer lap portion, and a hook formed on the inner lap portion and adapted to engage the retaining hole, the hook including hook edge portions extending aslant the longitudinal direction of the band body, and a bulging portion surrounded by the edge portions and bulging outward.

In the hose band of the invention described above, the hook edge portions abut against an edge portion of the retaining hole when the band is clamped with the hook in the hole. In this state, therefore, the inner and outer lap portions are brought closely into contact with each other without the possibility of the hook slipping out of the retaining hole. Moreover, the bulging portion enables the hook satisfactorily to resist a great tensile force.

BRIEF DESCRIPTION OF THE DRAWINGS

FIGS. 5 to 19 show an embodiment of the present invention, in which FIG. 5 is a side view of a hose band, FIG. 6 is a plan view showing hooks, FIG. 7 is a side view of the hooks, FIG. 8 is a sectional view of the hook taken along line VIII—VIII of FIG. 7, FIG. 9 is a plan view showing retaining holes of a band body, FIG. 10 is a side view showing the retaining holes of FIG. 9, FIG. 11 is a side view showing a retaining hole and a hook in engagement with each other, FIG. 12 is a sectional view showing the retaining hole and hook of FIG. 11, FIG. 13 is a perspective view showing the end of an inner lap portion of the band body and a stepped portion of an outer lap portion, FIG. 14 is a plan view showing a state that the end of the inner lap portion engages the stepped portion of the outer lap portion, FIG. 15 is a side view showing a flattened lug of the hose band, FIG. 16 is a side view showing a hook whose edge portion engages a perpendicular retaining hole edge portion, FIG. 17 shows the strength of a hook whose edge portion engages a slant retaining hole edge portion, FIG. 18 shows the strength of the hook of FIG. 17, and FIG. 19 is a side view showing the same state of FIG. 14;

FIGS. 20 to 23 show a variant of hooks, in which FIG. 20 is a plan view showing hooks of a band body, FIG. 21 is a side view showing the hooks of FIG. 20, FIG. 22 is a plan view showing the hooks and retaining holes in engagement with one another, and FIG. 23 is a side view showing the hooks and retaining holes of FIG. 22;

FIGS. 24 and 25 show another variant of a retaining hole, in which FIG. 24 is a plan view showing the retaining holes of a band body and FIG. 25 is a side view showing the retaining holes of the band body.

DETAILED DESCRIPTION OF THE PREFERRED EMBODIMENTS

Referring now to FIGS. 5 to 19, an embodiment of the present invention will be described in detail.

Figure 1:
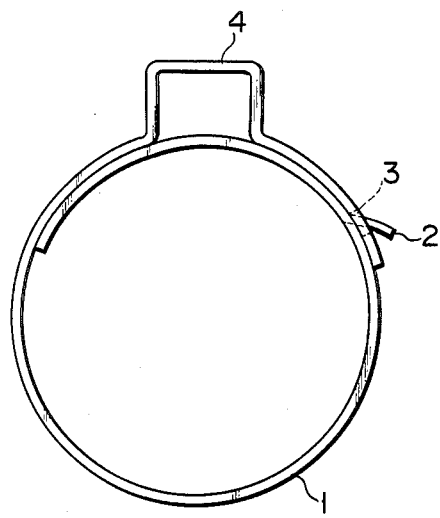
FIG. 1 is a side view of a prior art hose band.
Figure 2:
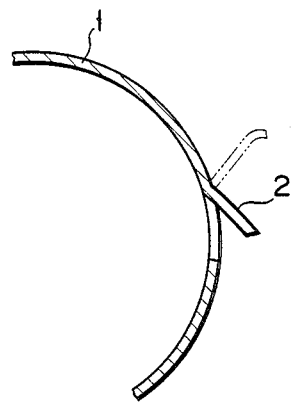
FIG. 2 is a sectional view showing a hook of the hose band of FIG. 1.
Figure 3:
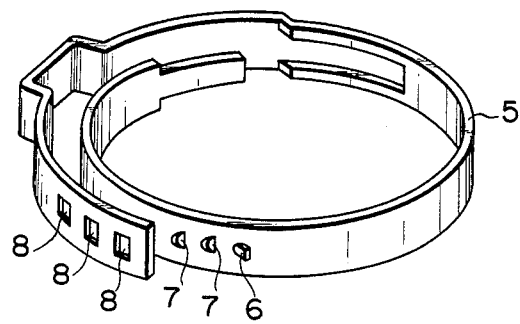
FIG. 3 is a perspective view of another prior art hose band.
Figure 4:
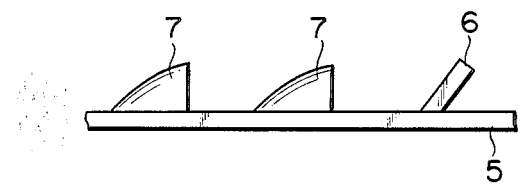
FIG. 4 is a side view showing projections of the hose band of FIG. 3.
Figure 5:
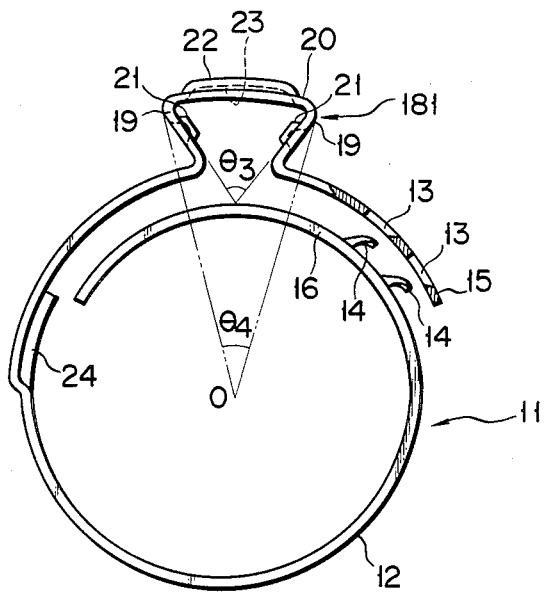

In FIG. 5, numeral 11 designates a hose band, which comprises metallic band body 12 formed of, e.g., a stainless-steel strip. Body 12 is free at either longitudinal end portion. In use, it is coiled into a ring so that the two end portions are joined one on top of the other. In this state, a plurality of retaining holes 13 and a plurality of hooks 14 are engaged to couple the end portions.

Retaining holes 13 are arranged spaced apart in the longitudinal direction of band body 12 at one end portion or outer lap portion 15 of the body.

Hooks 14 are formed at the other end portion or inner lap portion 16 of body 12, and can be releasably fitted in holes 13.

Figure 6:
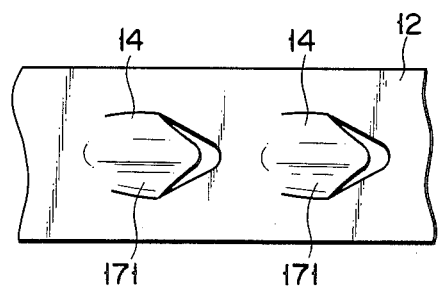
Figure 7:
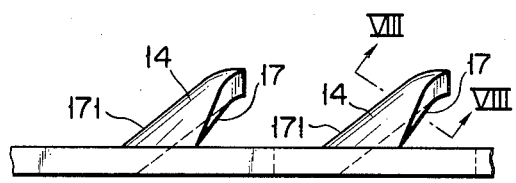
Figure 8:
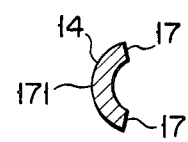
Figure 9:
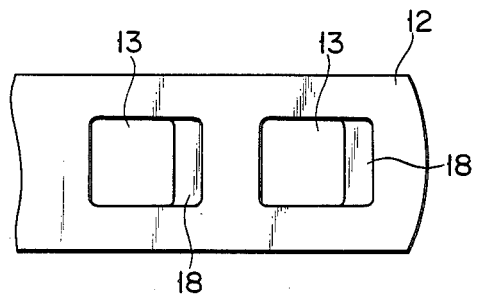
Figure 10:
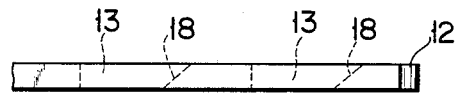

As shown in FIGS. 6 and 7, each hook 14 is formed by cutting and raising a part of band body 12 and then squeezing it outward. The extreme end side of hook 14 projects obliquely toward the end side of outer lap portion 15. Hook edge portion 17, inclined at tilt angle $\theta_1$ (see FIG. 11), is formed at each side of hook 14. As shown in FIG. 8, moreover, hook 14 has an arch-shaped cross section. Therefore, the hook has an outwardly bulged portion 171 which is bounded by edge portions 17.

As shown in FIGS. 9 to 12, retaining holes 13 are rectangular in shape, and edge portion 18 of each hole 13 to engage edge portions 17 of hook 14 is formed of a slanting surface which is inclined at tilt angle $\theta_2$ which is not narrower than angle $\theta_1$.

Clamp lug 181 is formed at the middle portion of band body 12 with respect to the longitudinal direction of the body. The lug, which is formed by bending the middle portion of body 12, includes a pair of leg portions 19 arranged in a fan-shaped configuration spreading outward and connecting portion 20 connecting the leg portions.

Figure 15:
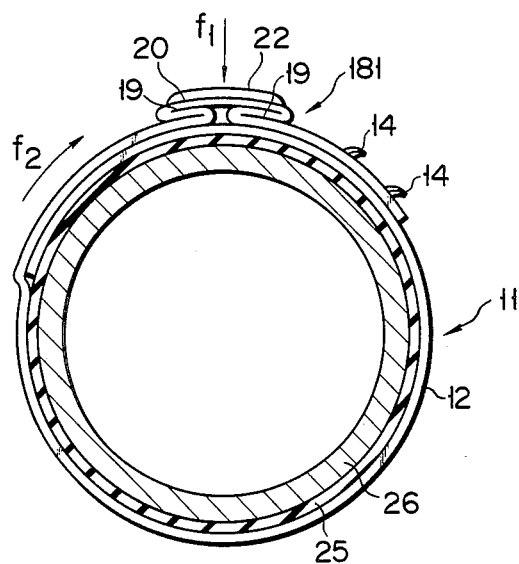

Leg portions 19 and connecting portion 20 are reinforced by dowel-shaped embossed projections 21 and 22. Projections 21 at portions 19 project toward the inside of lug 181, while projection 22 at portion 20 projects toward the outside of the lug. Hollow 23 inside projection 22 is large enough to house projections 21. In other words, two side projections 21 are adapted to be fitted precisely in hollow 23 when lug 181 is flattened, as shown in FIG. 15.

Spreading angle $\theta_3$ of leg portions 19 is wider than angle $\theta_4$ which is formed between lines connecting coiling center O of band 11 and the respective outer ends of leg portions 19.

The end of inner lap portion 16 is cut aslant the width of band body 12. Outer lap portion 15 includes stepped portion 24 which receives the end of portion 16. Portion 24 is inclined at the same angle as the end of portion 16, and provides a difference in level just great enough to compensate for the thickness of portion 16.

In actually using hose band 11 constructed in this manner, hooks 14 are disengaged from retaining holes 13 to release both ends of band body 12. In this state, body 12 is wound around hose 25, and hooks 14 are then fitted in their corresponding holes 13. Once they are fitted in holes 13, the hooks, which protrude obliquely, cannot easily be removed from the holes, thus maintaining the engagement.

Subsequently, external force is applied in the direction of arrow $f_1$ of FIG. 15, by means of a jig, to flatten lug 181. As a result, band body 12 is pulled in the direction of arrow $f_2$ to be reduced in diameter. Thus, band 11 can fix hose 25 to pipe 26 while clamping the hose tight.

In this embodiment, spreading angle $\theta_3$ of leg portions 19 is wider than angle $\theta_4$ between the lines connecting coiling center O of band 11 and the outer ends of portions 19, and those regions of lug 181 other than its bendable regions are reinforced by embossed projections 21 and 22. Therefore, lug 181 can easily be reduced to the flat state of FIG. 15 by the application of force $f_1$ thereto. The bendable regions may be formed with notches or perforations for ease of bending.

Figure 11:
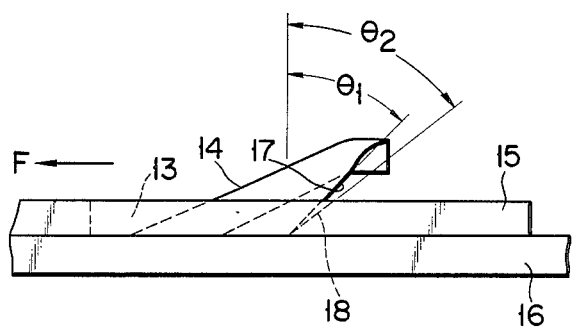
Figure 12:
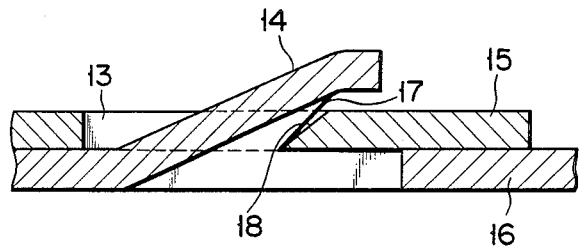
Figure 13:
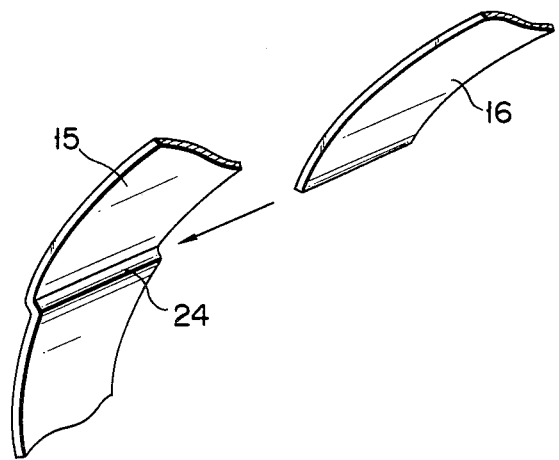

When band 11 is clamped with hooks 14 in retaining holes 13, as aforesaid, edge portions 18 of the holes abut against edge portions 17 of their corresponding hooks, so that inner and outer lap portions 16 and 15 are brought intimately into contact with each other, as shown in FIG. 11.

Having an arched or bulged portion 171, hooks 14 can satisfactorily withstand great tensile force as indicated by symbol F in FIG. 11. Thus, the hooks of one form are prevented from unexpected disengagement, and can resist the great clamping force.

Since lug 18 is flattened in the radial direction of band 11, a circumferential projection remaining after the clamping is reduced, making the band less liable to loosen.

Figure 16:
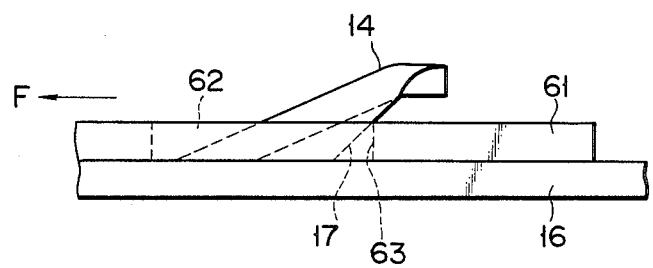
Figure 17:
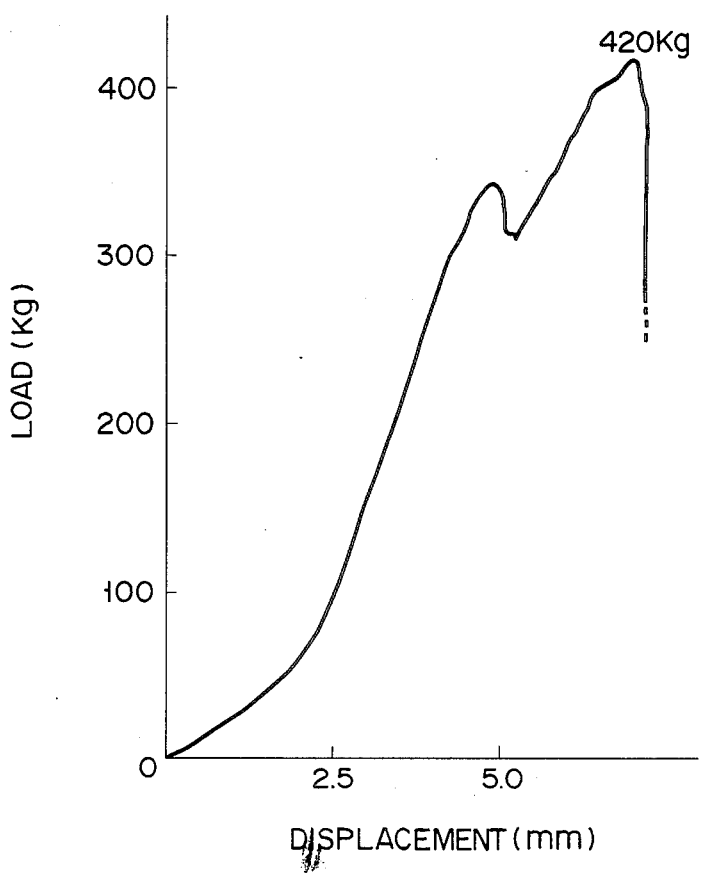

The clamping force acts in a direction such that edge portions 17 and 18 of hooks 14 and retaining holes 13 abut against one another. Since edge portion 18 of each hole 13 is inclined at angle $\theta_2$ not narrower than tilt angle $\theta_1$ of edge portions 17 of each hook 14, as shown in FIG. 11, it touches the basal part of hook edge portions 17 or comes flat into contact with portions 17. Accordingly, the bending moment acting in the direction to raise hook 14 up is substantially zero or much smaller than in a case where tilt angle $\theta_2$ of edge portion 63 of each retaining hole 62 of outer lap portion 61 is $\theta_2 = 0$, as shown in FIG. 16. Thus, hooks 14 can resist a greater clamping force. FIG. 17 shows a result of actual measurement of the strength of hook 14 obtained when edge portion 18 of retaining hole 13 is slanted, i.e., a relation between a load applied to hook 17 and a displacement caused at this time by the deformation of hook 14. The height of hook 14 is 3 mm. The graph of FIG. 16 indicates that hook 14 can resist a force up to about 420 kg. FIG. 18 shows a result of actual measurement of the hook strength obtained when edge portion 63 of hole 62 is not slanted, i.e., a relation between a load applied to hook 14 and a displacement caused at this time by the deformation of hook 14. In this case, as seen from FIG. 18, hook 14 breaks when it is subjected to a force of about 320 kg. Thus, the clamping force may be increased by about 100 kg if edge portion 18 of hole 13 is slanted. This leads to improved sealing capability.

Figure 14:
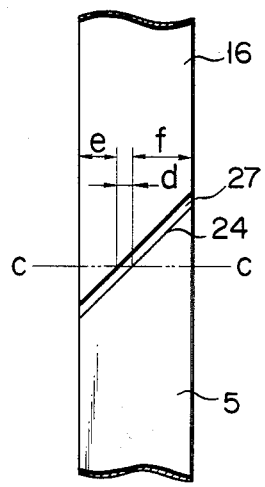

As mentioned before, the end of inner lap portion 16 is cut aslant the width of band body 12, and outer lap portion 15 has stepped portion 24 which receives the end of portion 16. Therefore, if slant gap 27 is formed between the end of portion 16 and stepped portion 24, as shown in FIGS. 14 and 19, band body 12 can be sealed across the width at any other portion than gap 27. Thus, the sealing capability is improved. More specifically, even though gap 27 between the end of portion 16 and stepped portion 24 is formed at region d along line c—c of FIG. 14, for example, no leakage is permitted because band body 12 is sealed at other regions e and f.

Figure 22:
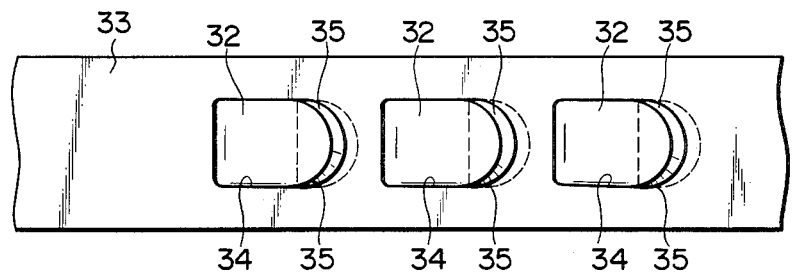
Figure 23:
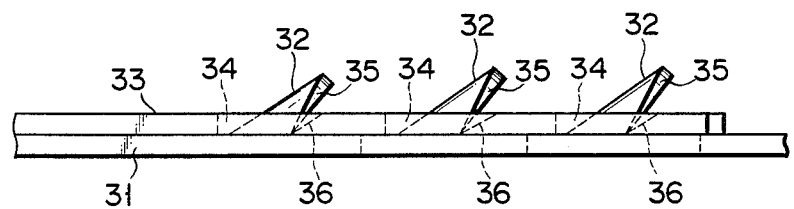

Referring now to FIGS. 20 and 21, there is shown a modified example of the configuration of the hooks. In this modification, the end of each hook 32 of inner lap portion 31 is semicircular in shape, as shown in FIG. 20, and protrudes obliquely and substantially straight, as shown in FIG. 21. Hooks 32, each, have edge portions 35 at each side thereof formed at a predetermined inclination angle. Further, hook 32 has an arch-shaped cross section. Therefore the hooks 31 have an outwardly bulged portion 37 which is bounded by edge portions 35. When the band is clamped with hooks 32 in retaining holes 34 of outer lap portion 33, as shown in FIGS. 22 and 23, edge portions 35 of hooks 32 abut against edge portions 36 of their corresponding holes 34. Thus, inner and outer lap portions 31 and 33 are brought closely into contact with each other, resisting a great clamping force.

Figure 24:
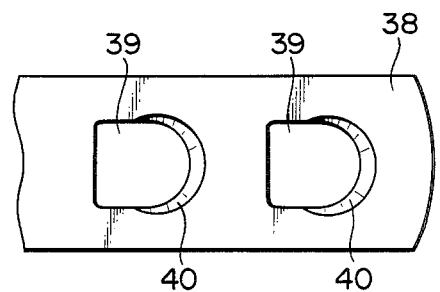
Figure 25:
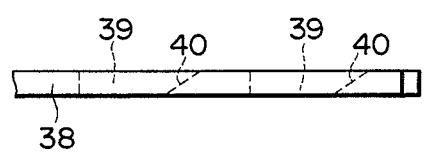
Figure 26:
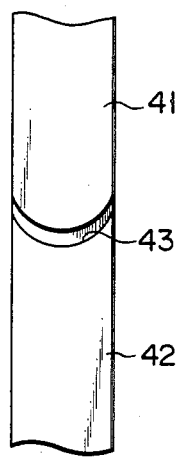
FIGS. 26 to 29 are plan views showing various modified configurations of the end of the inner lap portion of the band body and the stepped portion of the outer lap portion.
Figure 27:
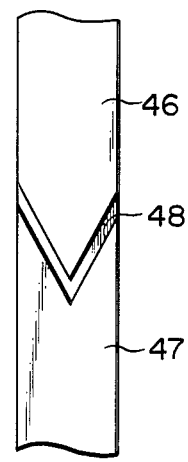
Figure 28:
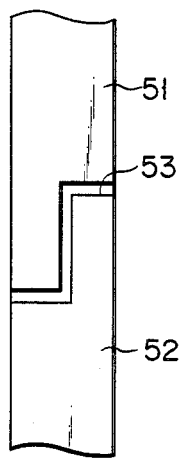
Figure 29:
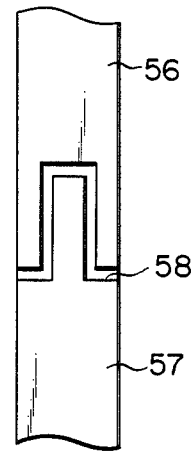

FIGS. 24 and 25 show a variant of a retaining hole. In this variant, retaining hole 39 is formed on an outer lap portion 38 such that retaining hole edge portion 40 to be engaged by the hook edge portion is arcuately formed and has a face inclined at an inclination angle greater than that of the hook edge portion.

FIGS. 26 to 29 show various modified configurations of the end of the inner lap portion of the band body and the stepped portion of the outer lap portion. In the modification shown in FIG. 26, the end of inner lap portion 41 is convexly arcuate, and stepped portion 43 of outer lap portion 42 is concavely arched to be complementary to the end of portion 41. In the modification shown in FIG. 27, the end of inner lap portion 46 is taperingly V-shaped, and stepped portion 48 of outer lap portion 47 is concavely V-shaped to be complementary to the end of portion 46. In the modification shown in FIG. 28, the end of portion 51 is square-shaped notch, and stepped portion 53 of outer lap portion 52 also has a square-shaped notch, so that ends of portions 51 and 53 have complementary shapes. In the modification shown in FIG. 29, the end of inner lap portion 56 is notched in the center to be U-shaped, and stepped portion 58 of outer lap portion 57 is bilaterally notched to be complementary to the end of portion 56.

In the embodiments described above, two or more hooks are arranged in series to effectively counter a slip or to provide great clamping force. Alternatively, according to the present invention, a single hook may be used with the same result.

What is claimed is:

1. A hose band comprising:
    an elongated metallic band body adapted to be wound around a hose, said band having inner and outer lap portions overlapping each other at both end portions, individually, said band body having an intermediate portion between said end portions;
    a retaining hole formed in the outer lap portion;
    a hook formed on the inner lap portion and adapted to engage the retaining hole, said hook including hook edge portions extending in a given direction relative to the longitudinal direction of said band body, and a bulging portion surrounded by said hook edge portions and bulging outward; and
    a clamp lug deformably mounted in said intermediate portion of said band body in the longitudinal direction of the band body, said clamp lug being deformable to reduce the diameter of said band body; and
    said retaining hole having a retaining hole edge portion which abuts against and engages at least part of said hook edge portions when said clamp lug is deformed to reduce the diameter of said band body so as to apply an abutting force to said hook edge portions;
    said retaining hole edge portion which engages at least part of said hook edge portions having a slanting surface which is inclined, relative to a perpendicular to said band body closely adjacent to said retaining hole edge portion, at an angle which is wider than the angle of at least said part of said hook edge portions which engage said retaining hole edge portion relative to a perpendicular to said band body closely adjacent to said hook edge portions.

2. A hose band comprising:
    an elongated metallic band body adapted to be wound around a hose, said band body having inner and outer lap portions overlapping each other at both end portions, individually, said band body having an intermediate portion between said end portions;
    a retaining hole formed in the outer lap portion;
    a hook formed on the inner lap portion and adapted to engage the retaining hole, said hook including hook edge portions extending aslant the longitudinal direction of the band body, and a bulging portion surrounded by said hook edge portions and bulging outward; and
    a clamp lug deformably mounted in said intermediate portion of said band body in the longitudinal direction of the band body, said clamp lug being deformable to reduce the diameter of said band body;
    said clamp lug being formed by bending said intermediate portion of said band body in the longitudinal direction of said band body, and said clamp lug including a pair of leg portions spreading outward and a connecting portion connecting said leg portions; and
    each of said leg portions of said clamp lug including an embossed projection projecting toward the inside of said clamp lug, and said connecting portion including an embossed projection projecting toward the outside of said clamp lug, so that the projections of said leg portions are held inside said projection of said connecting portion when said clamp lug is flattened to reduce the diameter of said band body; and
    said retaining hole having an edge portion which abuts against said hook edge portions when said clamp lug is deformed to reduce the diameter of said band body so as to apply an abutting force to said hook edge portions.

3. The hose band according to claim 2, wherein said retaining hole edge portion abuts against and engages at least part of said hook edge portions, said retaining hole edge portion which engages at least part of said hook edge portions having a slanting surface which is inclined, relative to a perpendicular to said band body closely adjacent to said retaining hole edge portion, at an angle which is wider than the angle of at least said part of said hook edge portions which engage said retaining hole edge portion relative to a perpendicular to said band body closely adjacent to said hook edge portions.

4. The hose band according to claim 1 or 2 wherein said outer lap portion includes a stepped portion adapted to receive the end of the inner lap portion, said stepped portion being shaped corresponding to the end shape of the inner lap portion.

5. The hose band according to claim 4, wherein the end of said inner lap portion is cut aslant the width of the band body, and the stepped portion of said outer lap portion is slanted to be complementary to the end of the inner lap portion.

6. The hose band according to claim 4, wherein the end of said inner lap portion is convexly arcuate, and the stepped portion of said outer lap portion is concavely arched to be complementary to the end of the inner lap portion.

7. The hose band according to claim 4, wherein the end of said inner lap portion is taperingly V-shaped, and the stepped portion of said outer lap portion is concavely V-shaped to be complementary to the end of the inner lap portion.

8. The hose band according to claim 4, wherein the end of said inner lap portion is one-sidedly notched to be hooked, and the stepped portion of said outer lap portion is hooked to be complementary to the end of the inner lap portion.

9. The hose band according to claim 4, wherein the end of said inner lap portion is notched in the center to be U-shaped, and the stepped portion of said outer lap portion is bilaterally notched to be complementary to the end of the inner lap portion.

10. The hose band according to claim 1, wherein said clamp lug is formed by bending said intermediate portion of said band body in the longitudinal direction of said band body.

11. The hose band according to claim 10, wherein said lug includes a pair of leg portions arranged in a fan-shaped configuration spreading outward and a connecting portion connecting the leg portions.

12. The hose band according to claim 11, wherein each said leg portion includes an embossed projection projecting toward the inside of the lug, and said connecting portion includes an embossed projection projecting toward the outside of the lug, so that the projections of the leg portions are held inside the projection of the connecting portion when the lug is flattened.

13. The hose band according to claim 12, wherein said embossed projections are dowel-shaped.

14. The hose band according to claim 10 or 2 wherein the spreading angle of the leg portions is wider than an angle formed between lines connecting the coiling center of the band body and the respective outer ends of the leg portions.

15. The hose band according to claim 1 or 2, wherein said part of said hook edge portion which abuts against said retaining hole edge portion abuts against said hole edge portion at the edge of said hook edge portion on the side of said band body.

16. A hose band comprising:
an elongated metallic band body adapted to be wound around a hose, said band body having inner and outer lap portions overlapping each other at both end portions, individually, said band body having an intermediate portion between said end portions;
a retaining hole formed in the outer lap portion;
a hook formed on the inner lap portion and adapted to engage the retaining hole, said hook including hook edge portions extending aslant the longitudinal direction of the band body, and a bulging portion surrounded by the edge portions and bulging outward; and
said band body including a clamp lug formed by bending said intermediate portion of said band body with respect to the longitudinal direction of said band body, so that said band body in a coiled formed is reduced in diameter by flattening of said clamp lug;
said lug including a pair of leg portions arranged in a fan-shaped configuration spreading outward and a connecting portion connecting said leg portions, each said leg portion including an embossed projection projecting toward the inside of said lug, and said connecting portion including an embossed projection projecting toward the outside of said lug, so that the projections of the leg portions are received inside said projection of said connecting portion when said lug is flattened to reduce the diameter of said band body.

17. The hose band according to claim 16, wherein said embossed projections are dowel-shaped.

18. A hose band comprising:
an elongated metallic band body adapted to be wound around a hose, said band body having inner and outer lap portions overlapping each other at both end portions, individually, said band body having an intermediate portion between said end portions;
a retaining hole formed in the outer lap portion;
a hook formed on the inner lap portion and adapted to engage the retaining hole, said hook including hook edge portions extending aslant the longitudinal direction of the band body, and a bulging portion surrounded by the edge portions and bulging outward; and said band body including a clamp lug formed by bending said intermediate portion of said band body with respect to the longitudinal direction of said band body, so that said band body in a coiled formed is reduced in diameter by flattening of said clamp lug;
said lug including a pair of leg portions and a connecting portion connecting said leg portions, each said leg portion including an embossed projection projecting toward the inside of said lug, and said connecting portion including an embossed projection projecting toward the outside of said lug, so that the projections of the leg portions are received inside said projection of said connecting portion when said lug is flattened to reduce the diameter of said band body.

19. The hose band according to claim 18, wherein said embossed projections are dowel-shaped.

20. The hose band according to claim 19, wherein said leg portions of said clamp lug are arranged in a fan-shaped configuration.

* * * * *